3,288,649
WATER-ACTIVATED BATTERY
John McCallum, Worthington, Ohio, assignor, by mesne assignments, to General Electric Company, Schenectady, N.Y., a corporation of New York
No Drawing. Filed July 24, 1963, Ser. No. 297,240
4 Claims. (Cl. 136—100)

This invention relates generally to electrical batteries, and more particularly, to improved anode compositions for water-activated primary batteries. Specifically, this invention pertains to the use of certain magnesium alloys as the active anode compositions in water-activated batteries for general improved performance.

Water-activated batteries employing a silver chloride or cuprous chloride cathode together with an anode of elemental magnesium are commercially available. The battery may be stored in a dry state and thereafter activated by immersion in an aqueous electrolyte or by passing electrolyte through a perforated housing member. While the electrochemical action may be initiated with distilled or tap water, better performance is obtained with an ionic electrolyte. The cell is generally characterized as capable of delivering large amounts of electrical power over a short period of time after activation, a high energy-to-weight or size ratio in the inactive state, and a short life once activation has been initiated. A common application for the device is marine use to supply power for torpedo propulsion systems, electric lamps, buoys, and the like. The battery may be activated for use simply by immersion in sea water.

A principal technical problems still existing with a water-activated battery is polarization of the magnesium anode. One solution employs alloys of magnesium with aluminum and mercury which polarize much less than elemental magnesium. Such compositions exhibit a desirable "sloughing" action in use whereby generally only minute particles of the composition ever pass into the electrolyte which cannot thereafter obstruct the electrolyte passage in the cell or provide any means of direct electrical contact between adjacent electrodes. While the described alloys provide substantial improvement in the performance of a water-activated battery, it would be desirable to obtain comparable performance with still other magnesium alloys. Such factors as cost of the mercury in the composition, possible handling problems associated therewith, and the general advantages resulting from the ability to select between different compositions makes it desirable to provide still other magnesium alloys exhibiting improved electrochemical behavior in a water-activated battery.

It is one important object of the invention, therefore, to provide improved magnesium alloys for water-activated batteries.

It is still another object of the invention to provide magnesium alloys exhibiting improved electrochemical behavior as well as ease of fabrication.

A still further object of the invention is to provide magnesium alloys capable of heat treatment for further improvement of electrochemical behavior and nature of sloughing activity.

These and other objects of the invention will be apparent from the following description illustrating in detail preferred anode compositions along with general preparation and method whereby the electrochemical properties may be further enhanced. Where parts and percentages are mentioned hereinafter in the specification and claims, reference is made to parts and percentages by weight per 100 parts by weight of the total alloys unless otherwise specified.

Briefly, the improved magnesium alloys of the invention all contain 3-9 parts by weight aluminum, 1-10 parts by weight lead, with the balance being predominantly magnesium. Compositions within the particular range specified exhibit less polarization in the battery than elemental magnesium and commercial alloys not containing lead together with the desirable small particle sloughing action during electrode reaction. Minor additions of still other alloying elements in the compositions can provide still further optimization of the electrochemical behavior.

Another class of the general magnesium alloys above disclosed contains 5-9 parts by weight aluminum, 1-5 parts by weight lead, and the balance being predominantly magnesium. A relatively larger ratio of aluminum to lead in the preferred alloys compared to the general compositions depresses the undesirable flaking action of the anode without materially lowering the output voltage and higher current densities attainable in the battery. Incorporation of relatively minor amounts of zinc in the preferred class of alloys in the range from about 0.1-2 parts by weight of zinc further enhances the desirable physical properties of the composition for electrode construction. Likewise,, relatively minor concentrations of manganese in the range of approximately 0.1-2 parts by weight in the alloy promotes the general improvements above described.

Still, another class of magnesium alloys exhibiting improved electrochemical behavior contains 3-9 parts by weight aluminum, 1-10 parts by weight lead, 0.5-5 parts by weight cadmium, and the balance being predominantly magnesium. Again relatively small concentrations of the zinc and manganese alloying elements in the compositions achieve the comparable benefits hereinbefore disclosed. The cadmium-containing alloys generally exhibit low sloughing tendency with as good output voltage and current under load conditions as can be obtained with other alloys of the invention.

A still further class of magnesium alloys exhibiting the improved electrochemical behavior along with depressed sloughing activity contains 3-9 parts by weight aluminum, 1-10 parts by weight lead, 0.5-5 parts mercury, and the balance being predominantly magnesium. Substitution of mercury in the alloy for the lead constituent within the weight range specified has been found to yield increase in cell output greater than is generally obtained with an equivalent amount of lead alone. On the other hand, the weight of mercury in the alloy should not exceed the weight of lead to prevent an increase in the sloughing activity during cell operation.

The alloys may be prepared by known metallurgical techniques for melting with the alloying elements being added before heating or added to the molten magnesium for usually better control of the final composition. Certain of the more volatile alloying elements such as mercury, cadmium, and zinc might be added in the pour ladle to further reduce vaporization losses. The alloys of the invention are suitably fabricated into a final electrode structure by any one of a number of known procedures including die casting, molding, ingot rolling, and the like. The alloys are also readily machineable subject to the usual safety precautions to be exhibited when machining magnesium metals generally.

Heat treatment of the alloys to provide an anneal develops even better physical properties for mechanical working and sloughing behavior. For the improvement, it is generally necessary to anneal the alloy up to about 700° F. for a sufficient period of time to dissolve the aluminum phase, thereafter cooling the alloy rapidly enough to maintain the aluminum phase in solution. Natural cooling in air has been found especially desirable in the designated annealing process. Air cooling generally produces smaller grain size in the alloy together with better adhesion between the metal grains than is obtained in quenched alloys. The air-cooled alloys can be expected to undergo less total sloughing with the portion which does slough forming fine precipitates in the electrolyte incapable of bridging the free space between adjacent electrodes. Still further improvement is obtained by heataging the alloy at low temperatures in the range from about 300–400° F. for redistribution of the mercury phase in the composition. This treatment again enhances both output voltage and current under load in the aged alloy.

*Example 1*

A ternary alloy containing approximately 6 parts aluminum, approximately 5 parts lead, and the balance magnesium was examined for electrochemical behavior by operation as the anode in a conventional water-activated battery employing a silver chloride cathode. Single anode and cathode elements were used in the form of flat sheets having dimensions of 1½ x 2 inches. The sheets were spaced apart at approximately 0.020 inch in a container for the electrolyte which included means for changing the electrolyte to approximately 12 times per minute during the test. The particular electrolyte employed comprised a synthetic sea water composition containing 121 grams sodium chloride and 26 grams epson salts per gallon of water. The test was conducted at an electrolyte temperature of approximately 75° F. with a constant load of approximately 0.22 ohm connected across the anode and cathode elements. The open circuit voltage of the cell measured 1.85 volts while the average current density measured 1.40 amperes per square inch. The present alloy exhibited significantly less sloughing than experienced with a binary lead-magnesium alloy containing 3 parts lead in the composition.

*Example 2*

Further improvement in both cell output and desirable sloughing behavior is obtained with slight modification in the composition of the preceding example. Thus, a magnesium alloy containing approximately 6 parts aluminum, approximately 5 parts lead, approximately 0.2 parts manganese, and the balance magnesium exhibited an open circuit voltage of 1.94 volts with an average current density of 1.66 amperes per square inch at the aforementioned test cell conditions. Only slight sloughing of the alloy was observed during cell operation as distinct from the moderate sloughing activity of the ternary alloy.

*Example 3*

Still further increase in the relative proportion of the lead in the alloy improves the electrochemical performance during cell operation. Accordingly, a magnesium alloy containing approximately 6 parts aluminum, approximately 10 parts lead, approximately 0.2 part manganese, and the balance magnesium exhibited an open circuit voltage of 1.93 volts in the test cell under the aforementioned operating conditions along with an average current density of 1.71 amperes per square inch.

*Example 4*

A different alloy within contemplation of the invention comprises approximately 8 parts aluminum, approximately 5 parts lead, approximately 0.2 part manganese and the balance magnesium. The electrochemical behavior of the alloy in cell operation under the usual conditions yielded an open circuit voltage of 1.91 volts along with an average current density of 1.71 amperes per square inch. The relatively large ratio of aluminum to lead in the preferred class of alloys depresses sloughing activity generally as illustrated by a lesser rate of sloughing for the present composition compared to the alloy of Example 3.

*Example 5*

A representative composition of the cadmium-containing alloys of the invention comprises a magnesium alloy containing 6 parts aluminum, approximately 5 parts lead, approximately 2 parts cadmium, approximately 0.2 part manganese, and the balance magnesium. The alloy exhibited an open circuit voltage of 1.91 volts in the test cell under the usual conditions with an average current density of 1.67 amperes per square inch.

*Examples 6–10*

Mercury-containing alloys within contemplation of the invention are listed in tabular form below. As was formerly recited, the proportion of mercury in the preferred listed compositions is maintained equal to or less than that for lead to prevent sacrifice of the desired sloughing behavior. It will also be noted that all compositions listed except in Example 8 contain relatively larger weight proportions of aluminum than lead in order to further decrease these rates of sloughing. All alloys reported were fabricated in sheet electrodes for test cell performance under the usual conditions. Cell output measurements appear in the table for the individual alloy compositions.

TABLE

| Example | Alloy Composition [1] | Open Circuit Voltage | Average Current Density at 0.22 ohm load (amps/in.[2]) |
|---|---|---|---|
| 6 | 6 aluminum<br>5 mercury<br>5 lead<br>0.2 manganese | 1.88 | 1.64 |
| 7 | 6 aluminum<br>5 mercury<br>10 lead<br>0.2 manganese | 1.90 | 1.69 |
| 8 | 6 aluminum<br>5 lead<br>2 mercury<br>0.2 manganese | 1.91 | 1.69 |
| 9 | 6 aluminum<br>5 lead<br>5 mercury<br>0.2 manganese | 1.88 | 1.64 |
| 10 | 6 aluminum<br>5 lead<br>5 mercury<br>2 cadmium<br>0.2 manganese | 1.94 | 1.68 |

[1] Parts by weight alloying elements per 100 parts by weight alloy with balance being magnesium.

From the foregoing description, it will be apparent that improved magnesium alloys for construction of an anode in a water-activated battery have been provided. It is not desired to limit the invention to the specific embodiments above shown, however, since it will be obvious to those skilled in the art that still further alloying elements might be added to the disclosed compositions in minor concentration. For example, the addition of alkali and alkaline earth elements higher than magnesium in the electromotive series is contemplated for still higher electrode potentials. It is intended to limit the present invention, therefore, only to the scope of the following claims.

What I claim as new and desire to secure by Letters Patent of the United States is:

1. In a water-activated battery having housing means containing a cathode member employing a chloride compound selected from the class consisting of silver chloride and cuprous chloride operatively associated with an anode member of magnesium alloy for activation of the battery with introduction of aqueous electrolyte, the improvement in combination therewith wherein the magnesium alloy contains 3–9 parts by weight aluminum, 1–10 parts by weight lead, and the balance being magnesium per 100 parts by weight alloy.

2. The product of claim 1 in which the magesium alloy additionally contains 0.1–2 parts by weight of an element selected from the class consisting of manganese, zinc and mixtures thereof per 100 parts by weight alloy.

3. In a water-activated battery having housing means containing a cathode member employing a chloride compound selected from the class consisting of silver chloride and cuprous chloride operatively associated with an anode member of magnesium alloy for activation of the battery with introduction of aqueous electrolyte, the improvement in combination therewith wherein the magnesium alloy contains 3–9 parts by weight aluminum, 1–10 parts by weight lead, 0.5–5 parts by weight mercury, and the balance being magnesium per 100 parts by weight alloy.

4. The product of claim 3 in which the magnesium alloy additionally contains 0.1–2 parts by weight of an element selected from the class consisting of manganese, zinc and mixtures thereof per 100 parts by weight alloy.

References Cited by the Examiner
UNITED STATES PATENTS

| | | | |
|---|---|---|---|
| 2,026,590 | 1/1936 | Paine | 75—168 |
| 2,045,242 | 6/1936 | Paine | 75—168 |
| 2,124,553 | 7/1938 | Gann | 75—168 |

WINSTON A. DOUGLAS, *Primary Examiner.*

A. SKAPARS, *Assistant Examiner.*